Figure 1:
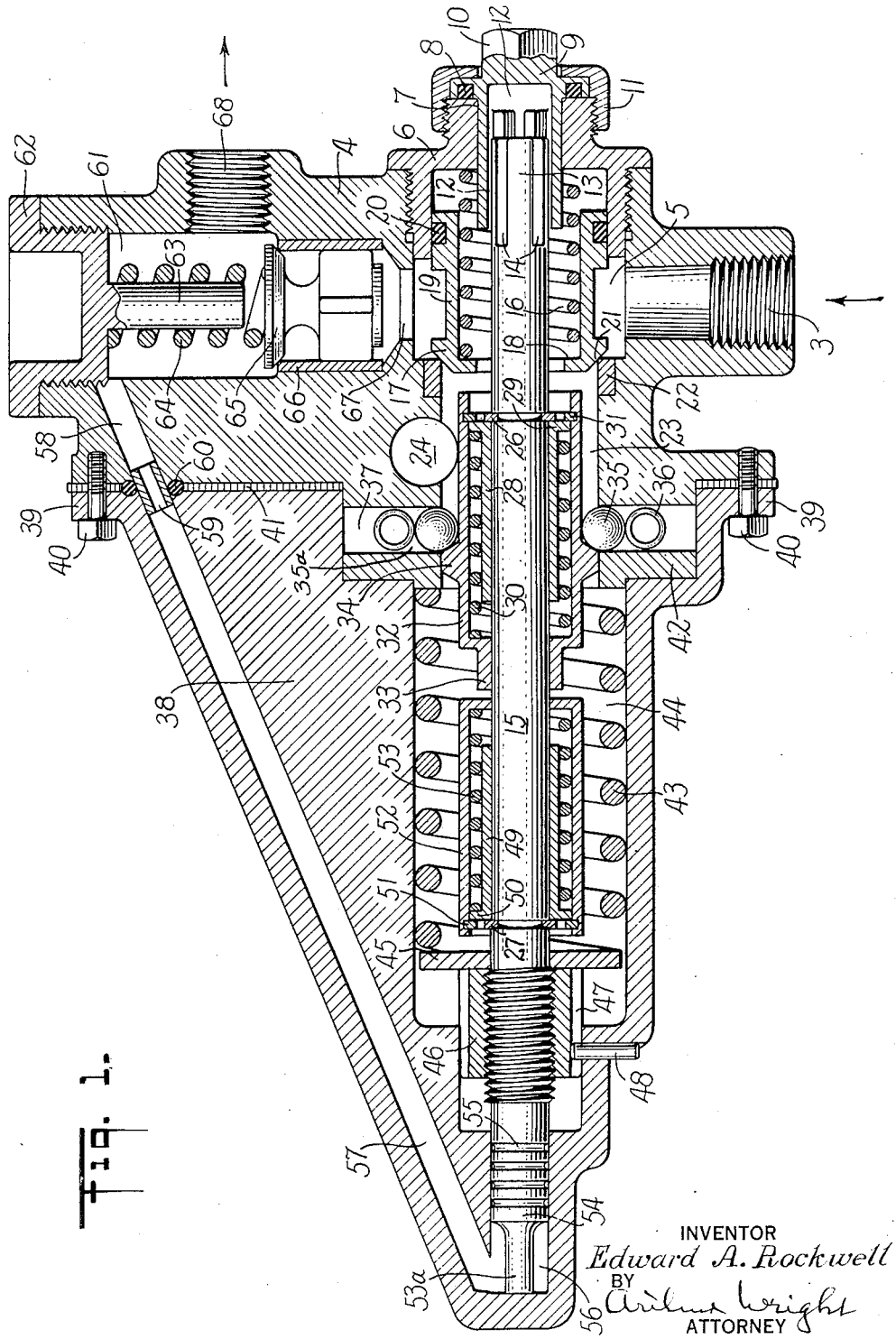

Jan. 2, 1951  E. A. ROCKWELL  2,536,141
SNAP ACTION MECHANISM
Original Filed Sept. 19, 1942  2 Sheets-Sheet 1

INVENTOR
Edward A. Rockwell
BY
Arthur Wright
ATTORNEY

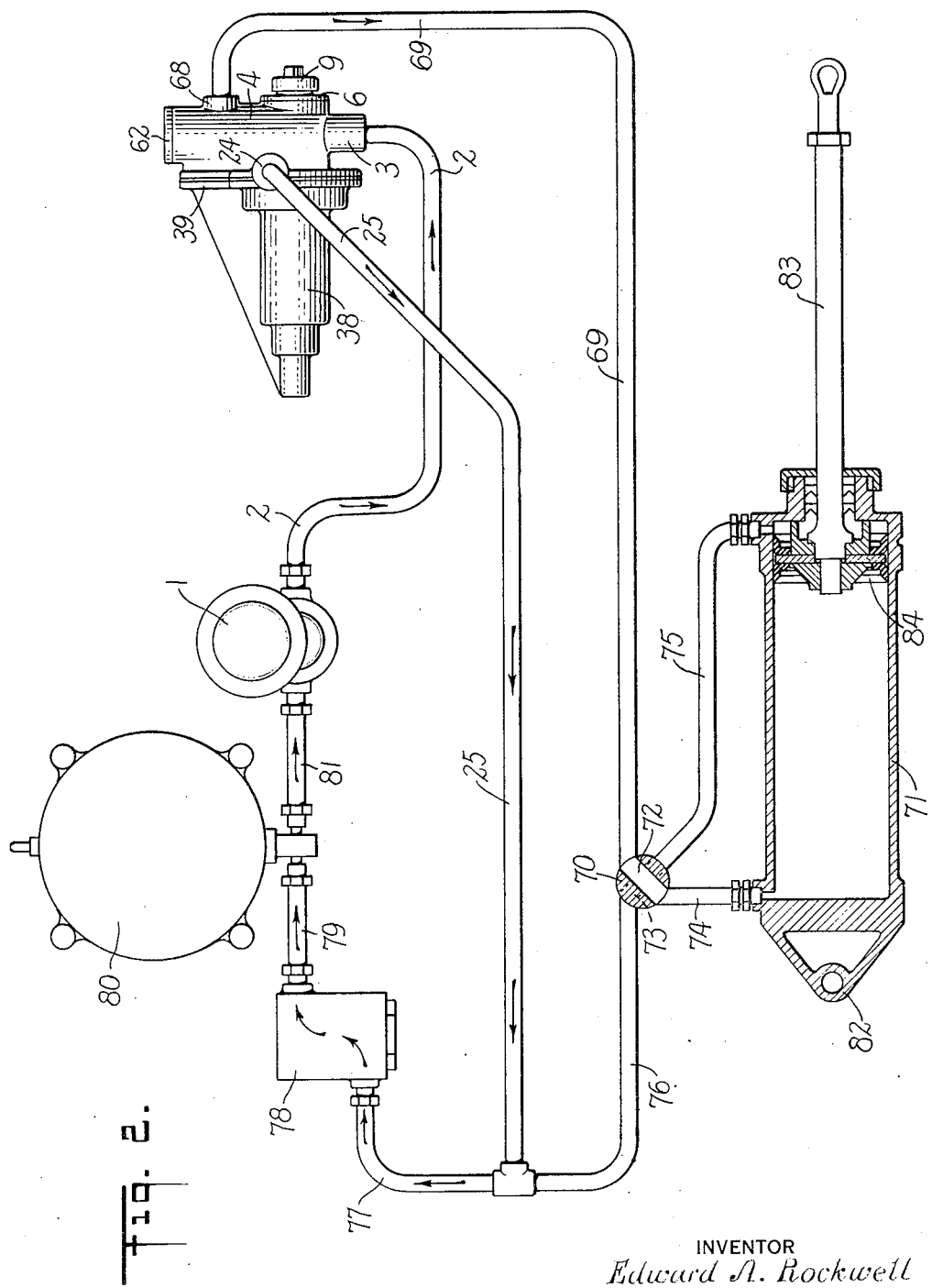

Patented Jan. 2, 1951

2,536,141

UNITED STATES PATENT OFFICE 2,536,141

SNAP-ACTION MECHANISM

Edward A. Rockwell, Cleveland, Ohio

Original application September 19, 1942, Serial No. 459,045. Divided and this application January 24, 1945, Serial No. 574,326

15 Claims. (Cl. 74—110)

My invention relates particularly to a snap-action mechanism adapted to be used within a desired device to be moved quickly from one position to another.

The present application is a division of my copending application upon "Unloader Valve," Serial No. 459,045, filed September 19, 1942, Patent No. 2,372,016, granted March 20, 1945.

The object of my invention is to provide a snap-action mechanism adapted to shift quickly any device desired to be moved thereby. Another object is to provide a mechanism of this character which is capable of being adjusted so as to alter the point at which the snap-action comes into operation for moving the said device. Another object is to provide an apparatus of this character having a plunger and a piston which is subjected to a hydraulic pressure determining the point at which the snap-action mechanism is actuated. Another object is to provide a compact apparatus of this character in which the element which controls the operation of the snap-action device is operated by means of a helical spring extending around the plunger which carries the said element. Still another object is to provide a ball detent for the said element and which preferably is provided on a set of balls having a circularly-arranged helical spring in a circular recess for controlling the said balls.

While my invention is capable of being carried out in many different ways, for the purpose of illustration I have shown only one form of my invention in the accompanying drawings, in which—

Fig. 1 is a vertical section of a snap-action mechanism made in accordance with my invention, and Fig. 2 is a diagrammatic representation of a pump circuit in which the same is adapted to be used, as applied, for example, to the operation of a hydraulic jack, such, for instance, as the jack used in operating the retracting undercarriage for the wheels of an airplane.

In the drawings, for supplying the hydraulic pressure I have shown a pump 1 of any desired character, but as, for example, a continuously operating gear pump which may be driven from the engine of an airplane in any desired way. The pump 1 is connected by a pipe 2 to an inlet port 3 of a valve casing 4 which may be supported on the airplane in any desired manner. The port 3 leads to a valve chamber 5 which is closed at one end by a screw ring 6 having an opening 7 which is sealed by an annular rubber seal 8 held in place by a screw plug 9 provided with a squared head 10. A screw ring 11 is carried over the outside of the screw ring 6 and the plug 9. In the interior of the plug 9 there is a fluted recess 12 for receiving an end 13, having a fluted end 14, of an element such as a shiftable release valve operating rod 15 for adjusting spring tensions. Supported around the plug 9 there is a helical spring 16, one end of which rests against the screw ring 6 and the other end of which extends into an annular release valve 17 where it rests against a shoulder 18 therein. The said release valve 17 has thereon a sleeve 19 having an annular rubber seal 20 arranged to slide within the screw ring 6. At the left-hand end of said valve there is a conical valve element 21 which cooperates with an annular insertable valve seat 22 supported within a lateral passageway 23 in the valve casing 4. The sleeve 19 is an annular balanced valve member which has the effect of balancing the large valve 17 so that it can be opened by small operating forces. Accordingly, the light spring 16 can be used, which is of only sufficient strength to return the valve 17 to its seat. The said passageway 23 leads to an exhaust port 24 which communicates with a return pipe 25. The said spring 16 normally keeps the conical valve member 21 on its seat 22, and parts are associated with the valve operating rod 15 for unseating the said valve member 21 when the pressure delivered by the unloader valve mechanism reaches a certain degree. For this purpose, on the valve operating rod 15 there are, tightly secured in recesses, annular stops or split rings 26 and 27. Adjacent to the split ring 26 there is a spring supporting sleeve 28 having a flange 29 to support a helical spring 30, acting as a yielding spring pressure accumulating means in one direction. The flange 29 rests against a split ring 31 located in a recess in a spring housing 32. The spring housing 32 has a restricted annular end 33 which is slidably carried upon the valve operating rod 15. On the outside of the spring housing 32 there is an annular flange 34 or detent which acts as an interrupted surface cooperating with a circular set or series of balls 35 located around the housing 32, in recesses 35a, and pressed towards the same by an annular helical spring 36 forming a complete uninterrupted circle within an auxiliary valve recess 37 which is contained in an auxiliary valve casing 38 provided with a flange 39 for securing the same to the valve casing 4 by means of screws 40, a gasket 41 being provided to make a tight joint. In the recess 37 there is located a portion of the valve casing 4 forming a spring retaining ring 42 against which one end of a strong helical spring 43 rests, the said spring 43 being located in a transverse cylindrical chamber 44 in the auxiliary casing 38, said chamber 44 and passageway 23 being a discharge chamber. The other end of the helical spring 43 is supported by a disk 45 on the valve operating rod 15, on which it is held in place by an adjusting means such as a screw-threaded non-rotatable sleeve 46 having longitudinal grooves 47, in one of which a key pin 48, passing through the auxiliary casing 38, is adapted to slide to permit adjustment of the tension of the spring 43. This adjustment of the disk 45 is limited owing to the fact that disc movement stops against the left face of the split ring 27. On the right-hand face of the split ring 27 there is a spring sleeve 49 having a flange 50 which rests against a split ring 51 in a recess within a spring housing 52. A helical spring 53 is located around the rod 15 between the spring sleeve 49 and the spring housing 52, acting as a yielding spring pressure accumulating means in the other direction. The left-hand end 54 of the valve operating rod 15 is provided with a stop extension 53a and a number of annular oil recesses 55 for sealing the same, and said end 54 is adapted to act as a piston or plunger so as to be moved by the oil pressure in a chamber 56 which has a connection with a passageway 57 in said auxiliary casing 38 communicating with a passageway 58 in the valve casing 4. The hydraulic pressure in said passageway 57 operates in opposition to said spring 43. A tight connection is made between the passageways 57 and 58 by a tube 59 having around the same a rubber ring 60 located at the joint between the casings 4 and 38. The said passageway 58, at the right-hand end thereof, leads to a vertical chamber 61 in the casing 4, which is closed by a screw plug 62 having a projection 63 thereon to act as a guide for a helical spring 64, the lower end of which rests upon the top of a check-valve 65 cooperating with an annular valve seat 66 carried in said chamber 61. In order to provide means for applying the hydraulic pressure so as to supply the needed force for work performance, at the side of the chamber 61 there is an outlet port 68 which leads to a pipe 69 which may act as or be an accumulator for conveying the pressure liquid to a hand valve 70 for controlling the supply of the pressure liquid to the respective ends of a cylinder 71 of a jack, which may be used, for example, for controlling the extending and retracting gear or one or more of the wheels of an airplane. While any type of valve 70 might be used for this purpose, as shown diagrammatically, it is comprised of two crossed passageways 72 and 73, one of which is adapted to connect the pipe 69 to the cylinder 71 by a pipe 74, while the other passageway connects the other end of a cylinder 71, by a pipe 75, to a pipe 76 leading to the pipe 75, and thence by a pipe 77 to a filter 78 and a pipe 79 leading to a reservoir 80 and from the said reservoir 80, by a pipe 81, to the intake of the pump 1. In other words, the hand valve 70 is so arranged that when it supplies the pressure liquid to either end of the cylinder 71, the other end thereof may be connected to the return pipe to the reservoir, although it is to be understood that any other known type of valve mechanism can be used for the supply and discharge of the pressure liquid from the jack. It will, of course, be understood, also, that the cylinder 71 of the jack may have a bracket 82 for its attachment to the airplane and a piston rod 83, which is moved by a piston 84, for moving the particular wheel or wheels to which it may be attached.

In the operation of my invention, assuming that the airplane engine is being operated, the pump 1 will be driven accordingly and liquid therefrom is available to be supplied by the pipe 2 through the check-valve 65 to the pipe 69 and thence to either end of the extending and retracting mechanism for the airplane wheels operated by the cylinder 71 of the jack provided for the same. It will, of course, be understood that there may be one such jack with its manual operating valve provided for operating each particular wheel of the airplane. When the pressure of the liquid which is thus supplied through the pipe 69 reaches any desired given maximum, this pressure, which is conveyed also through the passageway 57, will move the piston end 54 in opposition to the spring 43. This movement will continue until it reaches a position compressing the spring 53, until finally the lateral pressure exerted by the annular flange 34 on the balls 35 is sufficient to overcome the pressure exerted on the balls 35 by the annular helical spring 36, whereupon the flange 34 will be moved suddenly and quickly past the balls 35 to the right side of said balls. This will bring the end of the spring housing 32 against the valve 17 suddenly, so as to open the same with a snap action, thus releasing the pressure liquid to be returned by the pipe 25 to the reservoir 80 and back to the pump 1 until such time as the pressure within the pipe 69 is lowered sufficiently to close the valve 17. However, as the pressure is lowered, and before said valve 17 becomes closed, the valve operating rod 15 will move to the left, while the spring 43 is expanding, resulting in compressing the spring 30 until such time that the force exerted by the flange 34 towards the left is sufficient to overcome the force of the annular helical spring 36, whereupon, under the influence of the spring 43, the flange 34 will suddenly move to the left side of the balls 35, thus closing the valve 17 suddenly and effectively with a snap action. Thus, the unloader valve mechanism will continue to operate in the manner described above to maintain the given pressure being supplied through the pipe 69, and in a most effective manner, inasmuch as the valve 17 will always be moved suddenly and definitely in a minimum time interval to immediately change any abnormal condition of pressure in the pipe 69, thus maintaining it substantially constant at all times.

While I have described my invention above in detail, I wish it to be understood that many changes may be made therein without departing from the spirit of the same.

I claim:

1. A snap-action mechanism comprising, means for applying a force, an element having an operative connection to said means for applying force, a detent restraining the movement of the element having an operative connection to said means for applying force, a spring urging the detent into operative control of the element, yielding spring-pressure accumulating means having an operative connection to said element adapted to urge the element in each of two opposite directions by the accumulated spring pressure according to the relative position of said element, said yielding means having a connection to said means for applying force for forcing the element in one direction, a spring means for bringing about the movement of said element in the other direction and a member screw-threaded to said element for adjusting the point at which said last-mentioned spring means acts to move the element.

2. A snap-action mechanism comprising, means for applying a force, an element having an operative connection to said means for applying force, a detent restraining the movement of the element having an operative connection to said means for applying force, a spring urging the detent into operative control of the element, yielding spring-pressure accumulating means having an operative connection to said element adapted to urge the element in each of two opposite directions by the accumulated spring pressure according to the relative position of said element, said yielding means having a connection to said means for applying force for forcing the element in one direction, a spring means for bringing about the movement of said element in the other direction and means for adjusting the point at which said last-mentioned spring means acts to move the element, comprising an adjusting rod extending so as to be accessible to the outside of the mechanism.

3. A snap-action mechanism comprising, means for applying a force, an element having an operative connection to said means for applying force, a detent restraining the movement of the element having an operative connection to said means for applying force, a spring urging the detent into operative control of the element, yielding spring-pressure accumulating means having an operative connection to said element and having a plunger subject to said pressure, adapted to urge the element in each of two opposite directions by the accumulated spring pressure according to the relative position of said element, said yielding means having a connection to said means for applying force for forcing the element in one direction, a spring means for bringing about the movement of said element in the other direction and a member screw-threaded to said element for adjusting the point at which said last-mentioned spring means acts to move the element.

4. A snap-action mechanism comprising, means for applying a force, an element having an operative connection to said means for applying force, a detent restraining the movement of the element having an operative connection to said means for applying force, a spring urging the detent into operative control of the element, yielding spring-pressure accumulating means having an operative connection to said element and having a plunger subject to said pressure, adapted to urge the element in each of two opposite directions by the accumulated spring pressure according to the relative position of said element, said yielding means having a connection to said means for applying force for forcing the element in one direction, a spring means for bringing about the movement of said element in the other direction and means for adjusting the point at which said last-mentioned spring means acts to move the element, comprising an adjusting rod extending so as to be accessible to the outside of the mechanism.

5. A snap-action mechanism comprising, means for applying a force, an element having an operative connection to said means for applying force, a detent comprising a circular set of balls restraining the movement of the element having an operative connection to said means for applying force, a spring urging the detent into operative control of the element, yielding spring-pressure accumulating means located co-axially with said element and having an operative connection to said element adapted to urge the element in each of two opposite directions by the accumulated spring pressure according to the relative position of said element, said yielding means having a connection to said means for applying force for forcing the element in one direction and a spring for forcing said element in the other direction.

6. A snap-action mechanism comprising, means for applying a force, an element having an operative connection to said means for applying force, a detent comprising a circular set of balls restraining the movement of the element having an operative connection to said means for applying force, a spring urging the detent into operative control of the element, yielding spring-pressure accumulating means located co-axially with said element and having an operative connection to said element and having a plunger subject to said pressure, adapted to urge the element in each of two opposite directions by the accumulated spring pressure according to the relative position of said element, said yielding means having a connection to said means for applying force for forcing the element in one direction and a spring for forcing said element in the other direction.

7. A snap-action mechanism comprising, means for applying a force, an element having an operative connection to said means for applying force, a detent restraining the movement of the element having an operative connection to said means for applying force, means urging the detent into operative control of the element, yielding means having an operative connection to said element adapted to urge the element in each of two different directions according to the relative position of said element, said yielding means having a connection to said means for applying force for forcing the element in one direction, a spring means for bringing about the movement of said element in the other direction and a member screw-threaded to said element for adjusting the point at which the element is moved.

8. A snap-action mechanism comprising, means for applying a force, an element having an operative connection to said means for applying force, a detent restraining the movement of the element having an operative connection to said means for applying force, means urging the detent into operative control of the element, yielding means having an operative connection to said element adapted to urge the element in each of two different directions according to the relative position of said element, said yielding means having a connection to said means for applying force for forcing the element in one direction, a spring means for bringing about the movement of said element in the other direction and a member screw-threaded to said element for adjusting the point at which said last-mentioned spring means acts to move the element.

9. A snap-action mechanism comprising, means for applying a force, an element having an operative connection to said means for applying force, a detent restraining the movement of the element having an operative connection to said means for applying force, means urging the detent into operative control of the element, yielding means having an operative connection to said element adapted to urge the element in each of two different directions according to the relative position of said element, said yielding means having a connection to said means for applying force for forcing the element in one direction, a spring means for bringing about the movement of said element in the other direction and means for adjusting the point at which the element is moved, comprising an adjusting rod concentric with the spring means.

10. A snap-action mechanism comprising, means for applying a force, an element having an operative connection to said means for applying force, a detent restraining the movement of the element having an operative connection to said means for applying force, means urging the detent into operative control of the element, yielding means having an operative connection to said element adapted to urge the element in each of two different directions according to the relative position of said element, said yielding means having a connection to said means for applying force for forcing the element in one direction, a spring means for bringing about the movement of said element in the other direction and means for adjusting the point at which said last-mentioned spring means acts to move the element, comprising an adjusting rod concentric with the spring means.

11. A snap-action mechanism comprising, means for applying a force, an element having an operative connection to said means for applying force, a detent restraining the movement of the element having an operative connection to said means for applying force, means urging the detent into operative control of the element, yielding means having an operative connection to said element adapted to urge the element in each of two different directions according to the relative position of said element, said yielding means having a connection to said means for applying force for forcing the element in one direction, a spring means for bringing about the movement of said element in the other direction and means for adjusting the point at which the element is moved, comprising an adjusting rod and a non-rotatable sleeve associated therewith.

12. A snap-action mechanism comprising, means for applying a force, an element having an operative connection to said means for applying force, a detent restraining the movement of the element having an operative connection to said means for applying force, means urging the detent into operative control of the element, yielding means having an operative connection to said element adapted to urge the element in each of two different directions according to the relative position of said element, said yielding means having a connection to said means for applying force for forcing the element in one direction, a spring means for bringing about the movement of said element in the other direction and means for adjusting the point at which said last-mentioned spring means acts to move the element, comprising an adjusting rod and a non-rotatable sleeve associated therewith.

13. A snap-action mechanism comprising, means for applying a force, an element having an operative connection to said means for applying force, a detent restraining the movement of the element having an operative connection to said means for applying force, means urging the detent into operative control of the element, yielding means having an operative connection to said element adapted to urge the element in each of two different directions according to the relative position of said element, said yielding means having a connection to said means for applying force for forcing the element in one direction, a spring means for bringing about the movement of said element in the other direction and means for adjusting the point at which the element is moved, comprising an adjusting rod and a screw-threaded nut having a relative longitudinal movement with regard to said rod.

14. A snap-action mechanism comprising, means for applying a force, an element having an operative connection to said means for applying force, a detent restraining the movement of the element having an operative connection to said means for applying force, means urging the detent into operative control of the element, yielding means having an operative connection to said element adapted to urge the element in each of two different directions according to the relative position of said element, said yielding means having a connection to said means for applying force for forcing the element in one direction, a spring means for bringing about the movement of said element in the other direction and means for adjusting the point at which said last-mentioned spring means acts to move the element, comprising an adjustable rod and a screw-threaded nut having a relative longitudinal movement with regard to said rod.

15. A snap-action mechanism comprising, means for applying a force, a shiftable rod having an operative connection to said means for applying force, a detent restraining the movement of the rod having an operative connection to said means for applying force, means urging the detent into operative control of the rod, yielding spring means having an operative connection to said rod adapted to urge the rod in each of two opposite directions according to the relative position of said rod, said yielding spring means having a connection to said means for applying force for forcing the rod in one direction, a spring means for bringing about the movement of said rod in the other direction and a sleeve screw-threaded to the rod for adjusting the point at which said last mentioned spring means acts to move the rod after the accumulation of spring pressure by the yielding spring means.

EDWARD A. ROCKWELL.

REFERENCES CITED

The following references are of record in the file of this patent:

UNITED STATES PATENTS

| Number | Name | Date |
|---|---|---|
| 905,426 | Haywood | Dec. 1, 1908 |
| 1,480,942 | McKee | Jan. 15, 1924 |
| 1,768,625 | Olsen | July 1, 1930 |
| 1,770,912 | Clapp | July 22, 1930 |
| 1,932,736 | Janette | Oct. 31, 1933 |
| 2,111,424 | Goff | Mar. 15, 1938 |
| 2,201,498 | Ninnelt | May 21, 1940 |
| 2,339,421 | Newell | Jan. 18, 1944 |